Patented Nov. 30, 1926.

1,608,574

UNITED STATES PATENT OFFICE.

LAWRENCE M. ABLE, OF ST. MATTHEWS, SOUTH CAROLINA.

LAWN MOWER.

Application filed November 16, 1925. Serial No. 69,517.

My invention relates to improvements in lawn mowers and in particular to lawn mowers of the rotating reel-cutter type.

With a lawn mower of the above type it is very difficult, if not impossible at times, to make a good cut in grass which has been allowed to grow rank. I have found that a successful way to cut rank grass is to make several cuts, starting with a high cut and going over this with lower cuts until the grass is finally cut to the proper height.

In mowing machines of the above type it is usual to maintain the cutting reel a definite height above the ground by means of a roller which remains in contact with the ground during operation and supports the rear end of the mower frame in which the reel is mounted. By this means the height of the cutting reel above the ground may be adjusted to a limited extent by raising or lowering the frame on the roller support. This, however, affords only a limited range of adjustment, not sufficient to make a first cut in very tall grass. Moreover, when the cutter is raised appreciably, it causes the handle to be raised to a greater angle, thereby making it more difficult to operate, for with such a position of the handle the operator cannot obtain the full benefit of his weight in propelling the mower.

It is, therefore, an object of my invention to provide for readily adjusting the height of the cutter above the ground without having to shift the hands away from the most effective operating position.

An ancillary object of my invention is to provide means for accomplishing the main purpose of the invention, in the form of an attachment which may be readily applied, without special skill, to lawn mowers of the types now in common use.

It is to be understood, of course, that my invention may also be embodied in the structure of a lawn mower as originally manufactured.

I accomplish the objects of my invention by providing a special hinge structure intermediate the ends of the handle, thereby permitting the handle to be broken at the middle and the two portions to be adjusted to various angles to vary the height of the cutter above the ground.

One embodiment of my invention is illustrated in the accompanying drawing, in which:

Fig. 1 is a side elevation of a lawn mower showing the special hinge structure applied to the handle, but with the handle in its normal position.

Fig. 2 is a view in elevation showing the structure as seen from the operator's position, or from the right of Fig. 1.

Fig. 3 is a view in elevation similar to Fig. 1 but with the handle adjusted to a position for a high cut in which the cutter is raised a considerable distance above the ground as compared with Fig. 1.

In all the figures of the drawing the rotating cutter has been omitted for the sake of clearness of illustration, and as not being essential to a clear understanding of the invention.

Referring to the drawing, the general construction of the mower is that of a well known type, and consists of a pair of traction wheels 1 arranged to drive a rotating reel-cutter (not shown) mounted between the rigid side-frames 2, the cutting blades of the reel cooperating with the fixed cutter blade 3 which is supported at its ends by side frames 2. The cutter and fixed blade 3 are maintained a definite height above the ground by means of a roller 4 which is adjustably secured to the frame 2 by means of two slotted link members 5, which are clamped to side members 2 by means of bolts 6, passing through the slots in the link members and the side frames.

The handle, the lower portion of which is indicated at $7^a$, is secured to the frame of the mower by a bail, consisting of members 8 attached to each side of the lower portion of the handle, and usually secured to the frame by pivotal connections permitting a limited pivotal movement of the bail with respect to the frame. So far, the structure described is old and well known.

In applying my invention to this structure, I make the handle in two parts $7^a$ and $7^b$, and connect them together by a hinge 9, so as to allow the upper portion $7^b$ to swing down and assume various angles with respect to the lower portion $7^a$. As a means for clamping the upper portion $7^b$ in any desired position, I provide a hinge housing member 10, which consists of a sleeve portion $10^a$ secured to the lower handle portion $7^a$ by bolts or screws, or otherwise, and two sector shaped side members $10^b$, made integral with the sleeve portion $10^a$. These sector members are held in spaced relation to each other by an integral wall at the upper edge, constituting a continuation of the wall of the sleeve portion 10$^a$ lying along the upper side of the handle. At the lowermost corner of the housing, the side members 10$^b$ are held in parallel spaced relation by means of a spacing tube 11, and a bolt 12 passes through this tube and the two side members to clamp them securely together. The upper portion 7$^b$ of the handle may be moved freely between the side members 10$^b$ between two limits, the uppermost position being that shown in Fig. 1, in which the handle is stopped by the back wall connecting the two side members 10$^b$. The lowermost position will be that in which the handle comes in contact with spacing tube 11. The movable portion of the handle may be clamped between these two limits by means of a bolt 13, passing through the handle and side members 10$^b$, and provided with a clamping nut 14, which may be a wing nut, as shown. A series of holes 10$^c$ are formed in side members 10$^b$ to receive bolt 13 in clamping the handle in any one of several positions.

It is desirable that the frame of the mower and the handle, along with the hinge structure, be made as rigid as possible, and for this purpose I provide two brace rods 15 extending between the lower corners of the hinge housing and the side frames 2. These rods are secured at their upper ends to housing 10 by means of bolt 11, which also serves as a clamping element for the housing, as described above. At their lower ends, rods 15 are clamped to side frames 2 by means of bolts 6, which also serve to secure link elements 5 to the side frames.

When it is desired to use the mower under normal conditions, the handle is clamped as in Fig. 1, and the height of the cut will be that indicated at A. In this case, the thrust from the upper portion of the handle will be transmitted principally through the hinge 9 and the hinge housing 10 to the lower portion 7$^a$, thence to the frame of the mower. It is to be noted that, since the housing member 10 is in the form of an inverted channel member with its bed or web lying along the upper side of the handle, bolt 13 will not be essential for holding the handle in this position, because the channel bed will restrain the handle in its tendency to move upwardly.

When it is desired to make a first cut in rank grass, the handle is adjusted to a position shown in Fig. 3, and the height of the cut indicated at V will be much greater than the height of a normal cut indicated at A in Fig. 1. In this case, the thrust from the upper portion of the handle will be transmitted principally through clamping plates 10$^c$ to brace rods 15 and thence to the cutter frame. Thus, it will be seen that in this position, the connection between the sleeve portion 10$^a$ of the housing and the lower portion 7$^a$ of the handle is relieved of most of the strain, and there is very litttle tendency to split out this connection. I find it desirable, especially in positions in which roller 4 is not in contact with the ground, to secure the roller firmly to some rigid portion of the mower. For this purpose, I provide a brace strap 16 secured to the lower end of the handle, and extending around the roller to hold it rigid with the other structure.

While I have illustrated my invention in one specific form, it is obvious that various modifications may be made in details without departing from the spirit of the invention.

I claim:

1. In a mowing machine, the combination of a cutter frame, a handle mounted thereon and provided with a hinged joint intermediate its ends, means embracing said hinged joint for securing the two handle portions in definite fixed angular relations, and bracing means connecting said securing means and said cutter frame.

2. In a mowing machine, the combination of a cutter frame, a handle mounted thereon and provided with a hinged joint intermediate its ends, means for securing the two handle portions in definite fixed angular relations comprising a pair of plate elements secured to the lower portion of the handle, one on each side, and extending below the handle, means near the edge of the plates removed from the handle for holding the said plate members in fixed parallel relation, and brace rods extending between the outer edges of the plate members and the cutter frame.

3. A handle attachment for lawn mowers comprising a handle provided with a hinged joint intermediate its ends, a channel member secured to one handle portion and embracing said hinged joint to permit the other handle portion to swing between the sides of the channel member in a plane parallel to said sides, means for securing the movable handle portion in different angular positions within the channel member, and stop means comprising the bed of said channel member limiting the angular movement of the movable handle portion.

4. As an attachment for lawn mowers, a housing comprising a body portion adapted to be applied about the lower part of the lawn mower handle, and a pair of sector shaped parallel wings connected to each other throughout their entire length along one side parallel to the line of the lower part of the handle, said wings being perforated at intervals within their peripheries for the reception of fastening means which may be passed through the upper portion of the handle.

5. A mowing machine handle attachment for lawn mowers comprising a cutter frame, a handle attached thereto and provided with a hinged joint intermediate its ends permitting the upper portion of the handle to swing downwardly, means for securing the two handle portions in definite fixed positions comprising a metallic channel shaped member embracing the hinged joint with its bed lying along the top side of the handle, the sides of the channel extending downwardly beyond the handle, means securing one end of the channel member to the lower portion of the handle, means at the other end of the channel member for clamping the upper portion of the handle in various positions between the walls of the channel, and brace rods extending from the edge of the walls of the channel member on the open side to the cutter frame.

In testimony whereof I affix my signature.

LAWRENCE M. ABLE.

Certificate of Correction.

It is hereby certified that in Letters Patent No. 1,608,574, granted November 30, 1926, upon the application of Lawrence M. Able, of St. Matthews, South Carolina, for an improvement in "Lawn Mowers," errors appears in the printed specification requiring correction as follows: Page 2, line 57, for the letter "V" read $B$, and line 128, claim 5, strike out the words "mowing machine"; and that the said Letters Patent should be read with these corrections therein that the same may conform to the record of the case in the Patent Office.

Signed and sealed this 4th day of January, A. D. 1927.

[SEAL.]
M. J. MOORE,
*Acting Commissioner of Patents.*